United States Patent Office 2,891,933
Patented June 23, 1959

2,891,933
METHOD OF PURIFYING POLYMER SOLUTIONS

William J. Roberts, Havertown, Pa., assignor to Pennsylvania Industrial Chemical Corporation, Clairton, Pa., a corporation of Pennsylvania No Drawing. Application September 9, 1953
Serial No. 379,279

9 Claims. (Cl. 260—82)

This invention relates to the purification of polymer solutions in which the polymerization reaction is promoted by an acid-reacting metal halide polymerization catalyst. Specifically it relates to the purification of a polymer solution formed by a polymerization reaction conducted in a stream derived from the deep cracking of petroleum which contains negligible quantities of butadiene and isoprene and has a negligible or small content of polymerizable aromatics.

In conducting a polymerization in that starting material to give solutions containing the polymers of olefins and diolefins, the acid-acting metal halides are the greatly preferred catalysts for promoting the polymerization reaction. Good examples of the catalysts of that class are aluminum chloride, aluminum bromide, boron trifluoride and tin tetrachloride. Of these catalysts aluminum chloride and its substantial equivalent aluminum bromide are the most desirable and aluminum chloride presents some commercial advantage over aluminum bromide. There are some well recognized ill effects resultant from the use of the acid-reacting metal halide catalysts. If the quantity of the metal halide catalyst is not brought to a negligible value before a polymer solution is distilled for the separate recovery of solvent and resin, there is damage to the still which is employed and the formation of dark spots in the recovered resin. Any residual catalyst imparts acidity to the resin and forms water and oil insoluble complexes. The recovery procedure commonly practiced on polymer solutions which have been produced under the influence of a metal halide polymerization catalyst therefore must include at least one aqueous wash and is usually quite elaborate in its sequence of washings with water or dilute water solutions of mineral acid, dilute water solutions of a neutralizing agent with one or more final water washes.

In practice it is of particular importance that polymer solutions derived from the petroleum stream to which reference has been made above be particularly well purified against contamination by retained halide catalyst. Further to define that specific starting material, it is a cracked petroleum distillate consisting predominantly of conjugated dienes, secondary and tertiary olefins and unpolymerizable aromatics, the several such compounds containing mainly 5, 6 and 7 carbon atoms. That stream, which contains its own solvent diluent for the polymerization reaction in the form of unpolymerizable aromatics and other hydrocarbons inert to polymerization, is capable of yielding a light colored resin of good solubility and of relatively high softening point and low acid number. The retention of halide catalyst in this resin is particularly undesirable in detracting from the advantageous properties of the resin and decreasing its usefulness. Purification of the polymer solution by thorough washing is therefore of great importance.

There is a serious problem involved in washing the polymer solution containing the resin polymers and the initially present and any added solvent prior to the step of distilling off the solvent. This problem rises from the fact that contacting the predominantly hydrocarbon phase consisting of the polymer solution with an aqueous phase frequently leads to partial or complete emulsification of one phase in the other, either preventing the separation of the two phases or making it excessively difficult or expensive. In commercial operations speed of separation is important from the standpoint of economy. The retention of water in the oil layer results in the retention of acidity caused either by dissolved catalyst or by acid added to the wash water. The difficulty caused by emulsification is increased by the fact that the formation or absence of such emulsions is in large measure unpredictable and the causes of the emulsification are in some measure obscure. There are, however, certain factors which may be taken as causing a strong tendency for the polymer solution to form intractable emulsions with water. One such factor is a density of the polymer solution close to that of water. Another factor is a viscosity of the polymer solution which is so increased over the viscosity of the original monomeric liquid that the tendency to emulsify with water is substantially increased.

The polymer solution produced by the action of a metal halide catalyst on the starting material identified above possesses both high viscosity and a density very close to that of water. It is an oily material which is highly susceptible to emulsification with water. The difficulties caused by the tendency of this polymer solution to form intractable emulsions when washed has presented a serious obstacle to the recovery of clean, pale resin from that polymer solution when operating on a commercial scale. I have, however, discovered a treatment which is effective so to inhibit emulsification that it is possible thoroughly to wash the polymer solution rapidly and in satisfactory manner to free it of contamination by retained halide catalyst.

The above-indicated object is obtainable by including in the wash water an effective surface active agent. The problem involved in so doing is that the water is acidic either because of the dissolved acid-acting catalyst alone or additionally because of the fact that the wash water itself or a preceding wash is a dilute solution of mineral acid. Many surface active agents are ineffective or of greatly reduced efficiency in an acidulated aqueous medium. I have, however, discovered that the various water-soluble or water-dispersible cationic and non-ionic surface active agents are effective when included in acidulated wash water to inhibit persistent emulsification of the water and the described polymer solutions. The cationic surface active agents have the property of lowering the surface tension of water and the oil soluble end of their individual molecules is positively charged. The non-ionic surface active agents also have the property of lowering the surface tension of water but neither end of their individual molecules carries any appreciable electrical charge. A small proportion of such surface active agents, down to 0.01 percent the weight of wash water, or even less is adequate to produce desirable results.

Of the various cationic surface active agents usable in washing residual catalyst from the polymer solution I prefer the quaternary ammonium salts responding to the type formula:

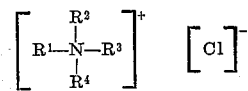

in which $R^1$, $R^2$, $R^3$ and $R^4$ are alkyl, aryl or alkaryl groups; and the reaction products of fatty amines and ethylene oxide responding to the type formula:

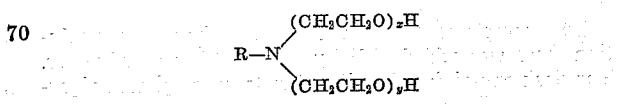

In which R is an alkyl, aryl or alkaryl group or the hydrochloride of one of those groups.

Of the various non-ionic surface active agents usable in washing residual catalyst from the polymer solution I prefer the reaction products of fatty acids or fatty and resin acids with ethylene oxide responding to the type formula:

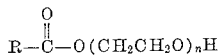

and the reaction products of fatty acid amides and ethylene oxide responding to the type formula:

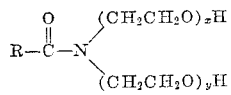

Considering the first practice of my invention as a feature of a complete resin-making operation, the above-described petroleum distillate starting material consisting predominantly of conjugated dienes, secondary and tertiary olefins and (unpolymerizable) aromatics, containing mainly 5, 6 and 7 carbon atoms was treated for about 2 hours with 1% by weight of powdered anhydrous aluminum chloride at a temperature controlled within the range of 40° C. to 45° C. at the end of the polymerization reaction and before distillation. The polymer solution was given a wash with a 5% water solution of sulphuric acid, followed by a water wash. Finally the polymer solution was given a wash with an alkaline water solution containing 10% $Na_2CO_3$. In each washing stage the water or water solution was agitated vigorously with the polymer solution and then was allowed to settle into oil and water layers. The settling was slow, even if slightly accelerated by gentle heating. There was a persistent milkiness of the oil layer and no clear and sharp line of division at the oil-water interface. After the settling which followed the final wash, the water and the polymer solution were separated as by decantation and the solution was steam distilled for the recovery of hard resin.

In the described recovery procedure as previously conducted there has been a very substantial loss of equipment time and production loss because of the long time required for settling. As also undesirable alternatives the washing operation is slighted or polymer solution containing water and contaminates is subjected to distillation. Occasionally, the settling operation even if of extended duration fails to give a clean sharp interface between the oil and water layers, so that the inclusion of a substantial water content with dissolved contaminates in the polymer solution is unavoidable. I have, however, discovered that by including in at least the first wash one of the above-identified acid-stable surface active agents a clean line of division is obtained at the interface between the water and the polymer solution and that this effect occurs rapidly in the settling stage.

The following series of experiments has been conducted fully to illustrate the practice of my invention. All the following examples describe washing and settling as performed on a single batch of polymer solution. That polymer solution was produced as above-described by subjecting the cracked petroleum distillate consisting predominantly of conjugated dienes and secondary and tertiary olefins, these compounds containing mainly 5, 6 and 7 carbon atoms, to polymerization with 1% its weight of powdered anhydrous aluminum chloride for a period of about two hours. This polymer solution was divided into a plurality of samples of identical composition and the procedure of all the examples was performed on those samples.

*Example No. 1*

To a sample consisting of 500 cc. of the polymer solution there was added 10% by volume (50 cc.) of water. The flask containing the oil and water was agitated vigorously until the diverse materials were thoroughly mixed. The flask stood for a settling period of 30 minutes. At the end of the settling period only 11 cc. of the water phase had separated and the upper layer was a milky oil-water emulsion.

This example is for purposes of comparison with examples of practice under the invention with acid-stable surface active agents. Those examples are:

*Example No. 2*

To a second 500 cc. sample of the polymer solution 50 cc. of water was added. This wash water contained 0.06% by weight of a quaternary ammonium salt responding to the first formula given above and to the more specific type formula to which many of the quaternary ammonium salts repond

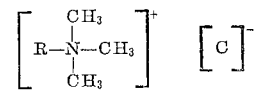

applying the material used in this example to those type formulae of variant breadth "$R^1$," or "R" is composed of 90% hexadecyl, 6% octadecyl and 4% octadecenyl groups. The oil and water were shaken together until thoroughly mixed. The mixture was allowed to settle for 30 minutes.

After the 30 minutes' settling time 44 cc. of aqueous phase had settled out, the supernatant oil layer was almost clear and there was no "rag" at the oil-water interface.

*Example No. 3*

To a third sample of the polymer solution amounting to 500 cc. there was added 50 cc. of wash water and the ingredients were shaken together until thoroughly emulsified. The wash water contained 0.06% its weight of another quaternary ammonium salt. The ammonium salt responded to the first stated formula and its more specific exemplification given in Example No. 2, but in it "$R^1$" or "R" is composed of 90% dodecyl, 9% tetradecyl and 1% octadecenyl groups.

After shaking to form the mixture, the flask containing it was allowed to stand for 30 minutes' settling time. At the end of the settling period 43 cc. of the aqueous phase had separated out, the supernatant oil layer was murky rather than milky as was the oil-water emulsion and only a small "rag" was present at the oil-water interface.

*Example No. 4*

To a fourth sample of the polymer solution amounting to 500 cc. there was added 50 cc. of wash water and the flask containing the oil and water was shaken vigorously until a milky oil-water mixture was formed. The flask then was allowed to stand for a settling period of 30 minutes.

The wash water contained 0.06% its weight of an ethanolated alkyl guanidine-amine complex of high molecular weight.

After the settling period 43 cc. of aqueous phase had separated out, the oil layer was almost clear and there was only a small "rag" at the oil-water interface.

*Example No. 5*

To a fifth sample of the polymer solution amounting to 500 cc. there was added 50 cc. of wash water and the flask containing the oil and water was shaken vigorously until a milky oil-water mixture was formed. The flask then was allowed to stand for a settling period of 30 minutes.

The wash water contained 0.06% of a sulphonic acid salt of amine-ethylene oxide condensate.

After the settling period 39 cc. of the aqueous phase had separated and the oil layer was merely murky in distinction from the milky appearance of the initial emulsion.

Example No. 6

To a sixth sample of the polymer solution amounting to 500 cc. there was added 50 cc. of wash water and the flask containing the oil and water was shaken vigorously until a milky oil-water mixture was formed. The flask then was allowed to stand for a settling period of 30 minutes.

The wash water contained 0.06% its weight of a tertiary amine responding generally to the second formula given above.

After the settling period 38 cc. of aqueous phase had separated and the supernatant oil layer was of a yellowish appearance and there was only a small "rag" at the oil-water interface.

The foregoing examples, except for Example No. 1, all relate to the use of cationic surface active agents to promote separation between the oil and water layers in washing the specified polymer solution. The following examples illustrate the use of non-ionic surface active agents for the same purpose.

Example No. 7

To a seventh sample of the polymer solution amounting to 500 cc. there was added 50 cc. of wash water and the flask containing the oil and water was shaken vigorously until a milky oil-water mixture was formed. The flask then was allowed to stand for a settling period of 30 minutes.

The wash water contained 0.06% its weight of a reaction product of fatty acid and ethylene oxide responding to the third formula given above in which the fatty portion is composed of 70% rosin acids, 15% oleic acid and 15% linoleic acid and in which the other portion contains about 15 mols. of ethylene oxide.

After the settling period 42 cc. of the aqueous phase had separated, and the supernatant oil layer was murky in distinction from the initial milky emulsion.

Example No. 8

To an eighth sample of the polymer solution amounting to 500 cc. there was added 50 cc. of wash water and the flask was shaken vigorously until a milky oil-water mixture was formed. The flask then was allowed to stand for a settling period of 30 minutes.

The wash water contained 0.06% its weight of an ethylene oxide derivative of a fatty acid amide responding to the fourth formula given above, in which the amide portion is cocoamide and the other portion of the molecule comprises about 10 mols. of ethylene oxide.

After the settling period 43 cc. of aqueous phase had separated and the supernatant oil layer was merely murky in distinction from the initial milky emulsion.

Example No. 9

To a ninth sample of the polymer solution there was added 50 cc. of wash water and the flask containing the oil and water was shaken vigorously until a milky oil-water mixture was formed. The flask was allowed to stand for a settling period of 30 minutes.

The wash water contained 0.06% its weight of an ethylene oxide derivative of a fatty acid amide responding to the fourth formula given above. This material is very similar to the material of Example No. 8 but has about 5 mols rather than about 10 mols of ethylene oxide in the ethylene oxide portion of the molecule.

After the settling period 34 cc. of aqueous phase had separated, the oil layer was merely murky in distinction from the initial milky emulsion and the oil-water interface was sharp.

Relating the practice of my invention to the recovery stages of a commercial operation of a continuous sort as distinguished from the batch operation described above, a cracked petroleum distillate consisting predominantly of conjugated dienes, secondary and tertiary olefins and unpolymerizable aromatics, these compounds containing chiefly 5, 6 and 7 carbon atoms were treated at a temperature of 40° C. with approximately 1% its weight of anhydrous aluminum chloride. The reaction was effected continuously in apparatus commonly designated as a continuous flow stirred tank reactor type, the temperature being maintained within the desired limits by heat exchangers to remove the exothermic reaction heat, and the flow so adjusted as to give about a 2 hour mean contact time in the reaction vessels. The effluent, containing catalyst and containing polymeric material formed by the action of the catalyst on the diolefinic and on a portion of the olefinic hydrocarbons fed, was fed continuously to a vessel equipped with a vigorous agitator and to which was simultaneously fed 10% by volume (based on the original cracked distillate) of a water solution containing 5% by weight of sulfuric acid and $\frac{1}{16}$ of 1% of a non-ionic surface active agent, namely the ethylene oxide derivative of a fatty acid used in Example No. 7 given above.

The intimately contacted mixture of aqueous and hydrocarbon phases flowed continuously to a decanting vessel, wherein the washed oil upper layer overflowed and the aqueous layer was drawn off the bottom at a rate such as to maintain a constant level of the interface between the two phases. The water layer from the separator, containing now the major part of the aluminum chloride from the reaction mixture, was reasonably clear, the oil layer was also relatively clear and the interface between the aqueous and hydrocarbon phases was sharp. By way of contrast, when the surface active agent was omitted, all other variables in the process being kept constant, the interface became indistinct as the result of the appearance of a steadily growing "rag," the latter tending to grow in the aqueous phase.

It has been explained that at least one wash should be given the above-described polymer solution formed by a polymerization reaction stimulated by an acid-acting metal halide catalyst, in order to purify the polymer solution of residual catalyst and to obtain a clear pale resin. By including an acid-stable cationic or non-ionic surface active agent in the water of the one wash or at least the first of a series of washes, clean separation between the oil phase and the aqueous phase is greatly expedited and the time consumed in the entire washing operation is cut to less than half. Also, by this practice it is possible in satisfactory manner to "break" emulsions which would be definitely intractable as formed in washing operations lacking an effective surface active agent. Such persistent emulsions render the washing operation inadequate to free the polymer solution of the contaminates dissolved in the aqueous member of the wash. In the absence of acid-stable surface active agents, for the reasons mentioned previously, the polymer solutions tend to form the persistent emulsions when contacted with the aqueous phase sufficiently to promote effective washing.

I claim as my invention:

1. The method of removing acid-reacting halide catalyst from a polymerization reaction mixture containing the same and formed by the polymerization of a cracked petroleum distillate containing mainly 5, 6 and 7 carbon atom conjugated dienes, secondary and tertiary olefins in the presence of said catalyst, which comprises mixing said reaction mixture at least once with an acid aqueous wash liquor containing from 0.01 to 0.06 of 1% by weight of the water of an acid-stable, non-ionic surface-active agent comprising a polymeric product of the reaction of a material selected from the class consisting of fatty acids and mixtures of fatty and resin acids with ethylene oxide, vigorously agitating the mixture so formed, allowing said mixture to settle, whereby an oil phase and aqueous phase are formed, and separating said oil phase from said aqueous phase, said surface-active agent functioning to prevent prolonged emulsification of said oil phase and said aqueous phase.

2. The method according to claim 1 wherein said petroleum distillate contains hydrocarbon inert to polymerization, which serves as a diluent for the process.

3. The method according to claim 1 wherein the acid-reacting halide catalyst is aluminum chloride.

4. The method according to claim 3, wherein said non-ionic, surface active agent is a polymeric product of fatty acid and ethylene oxide, said fatty acid portion being composed of 70% rosin acids, 15% oleic acid and 15% linoleic acid, and the other portion containing about 15 moles of ethylene oxide.

5. The method according to claim 4 wherein the acid aqueous wash liquor contains .06% its weight of said fatty acid ethylene oxide reaction product.

6. A continuous method of removing acid-reacting catalyst from a polymerization reaction mixture containing the same and formed by the polymerization of a cracked petroleum distillate containing mainly 5, 6 and 7 carbon atom conjugated dienes, secondary and tertiary olefins and unpolymerizable aromatics in the presence of said catalyst, which comprises mixing said reaction mixture and an acidic aqueous wash solution containing from 0.01 to 0.06 of 1% by weight of a non-ionic, acid stable, surface-active agent, feeding said mixture to a decanting zone, withdrawing a washed oil upper phase from the top of said decanting zone and an aqueous phase from the bottom of said decanting zone at such a rate so as to maintain a constant level of interface between said two phases, whereby said aqueous phase contains the major portion of catalyst contained in said polymerization mixture, said surface-active agent comprising a polymeric product of the reaction of a material selected from the class consisting of fatty acids and mixtures of fatty and resin acids with ethylene oxide, and said surface-active agent functioning to prevent prolonged emulsification of said oil phase and said aqueous phase.

7. A method according to claim 6 wherein said acid reacting catalyst is aluminum chloride.

8. A method according to claim 7, wherein said non-ionic surface-active agent is a polymeric product of fatty acid and ethylene oxide, said fatty acid portion being composed of 70% rosin acid, 15% oleic acid and 15% linoleic acid, and the other portion containing about 15 moles of ethylene oxide.

9. A method according to claim 8, wherein said acidic aqueous wash solution contains 1/16 of 1% by weight of said non-ionic surface-active agent and wherein 10% by volume, based on the cracked distillate, of said acidic aqueous wash solution is employed.

References Cited in the file of this patent

UNITED STATES PATENTS

| 2,099,090 | Webb | Nov. 16, 1937 |
| 2,115,564 | Thomas et al. | Apr. 26, 1938 |
| 2,523,150 | Schneider et al. | Sept. 19, 1950 |

OTHER REFERENCES

Schwartz and Perry: "Surface Active Agents," Interscience, New York (1949). Copy in Sci. Lib., pp. 8, 19, 206–07, 373, 504, 516.